(12) United States Patent
Imamura et al.

(10) Patent No.: US 12,437,897 B2
(45) Date of Patent: Oct. 7, 2025

(54) MAGNET WIRE AND COIL

(71) Applicant: DAIKIN INDUSTRIES, LTD., Osaka (JP)

(72) Inventors: Hitoshi Imamura, Osaka (JP); Hiroaki Wada, Osaka (JP); Yasuyuki Yamaguchi, Osaka (JP); Takeshi Kozuki, Osaka (JP); Yuuki Kuwajima, Osaka (JP); Manabu Fujisawa, Osaka (JP); Masamichi Sukegawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 374 days.

(21) Appl. No.: 17/605,635

(22) PCT Filed: Apr. 17, 2020

(86) PCT No.: PCT/JP2020/016917
§ 371 (c)(1),
(2) Date: Oct. 22, 2021

(87) PCT Pub. No.: WO2020/218205
PCT Pub. Date: Oct. 29, 2020

(65) Prior Publication Data
US 2022/0223316 A1    Jul. 14, 2022

(30) Foreign Application Priority Data
Apr. 26, 2019 (JP) .................. 2019-085303

(51) Int. Cl.
*H01B 3/44* (2006.01)
*H01B 1/02* (2006.01)
*H01F 1/14* (2006.01)

(52) U.S. Cl.
CPC ............. *H01B 3/445* (2013.01); *H01B 1/026* (2013.01); *H01F 1/143* (2013.01)

(58) Field of Classification Search
CPC ........................ H01B 3/445; H01F 41/02–04
(Continued)

(56) References Cited

U.S. PATENT DOCUMENTS

2003/0157324 A1* 8/2003 Kono ................ C08J 3/126
                                                    428/402
2009/0038821 A1* 2/2009 Sato .................. C08F 214/262
                                                    521/149
(Continued)

FOREIGN PATENT DOCUMENTS

| CN | 101364456 A | 2/2009 |
| CN | 105900186 A | 8/2016 |

(Continued)

OTHER PUBLICATIONS

International Preliminary Report of Patentability (with translation of the Written Opinion) dated Sep. 28, 2021, issued by the International Bureau in application No. PCT/JP2020/016917.
(Continued)

*Primary Examiner* — Larissa Rowe Emrich
(74) *Attorney, Agent, or Firm* — Sughrue Mion, PLLC

(57) ABSTRACT

A magnet wire including a conductor and an insulating coating formed on an outer periphery of the conductor. The insulating coating contains a copolymer containing a tetrafluoroethylene unit and a fluoroalkyl vinyl ether unit. The copolymer has a melt flow rate of 10 to 60 g/10 min, and the copolymer has a fluoroalkyl vinyl ether unit content of 6.2 to 8.0% by mass based on a total content of monomer units.

5 Claims, 2 Drawing Sheets

(58) Field of Classification Search
USPC .......................................... 242/430; 335/299
See application file for complete search history.

(56) References Cited

U.S. PATENT DOCUMENTS

| | | | |
|---|---|---|---|
| 2010/0314153 A1* | 12/2010 | Ishii | H01B 3/445 |
| | | | 428/141 |
| 2015/0158988 A1* | 6/2015 | Sawaki | B29C 35/08 |
| | | | 264/494 |
| 2015/0299402 A1 | 10/2015 | Aten et al. | |
| 2015/0357084 A1* | 12/2015 | Masuda | H01B 3/301 |
| | | | 428/379 |
| 2016/0194512 A1 | 7/2016 | Bandi et al. | |
| 2016/0319089 A1 | 11/2016 | Imamura et al. | |
| 2016/0322128 A1* | 11/2016 | Imamura | H01B 7/0275 |
| 2016/0340455 A1 | 11/2016 | Abe et al. | |
| 2017/0260344 A1 | 9/2017 | Imamura et al. | |
| 2017/0294249 A1* | 10/2017 | Oya | H02K 3/30 |
| 2018/0005725 A1 | 1/2018 | Nonaka | |
| 2018/0265654 A1 | 9/2018 | Imamura et al. | |
| 2021/0071027 A1 | 3/2021 | Bandi et al. | |

FOREIGN PATENT DOCUMENTS

| | | |
|---|---|---|
| EP | 3 076 405 A1 | 10/2016 |
| EP | 3 778 723 A1 | 2/2021 |
| JP | 62-58519 A | 3/1987 |
| JP | 2014-028951 A | 2/2014 |
| JP | 2015-507061 A | 3/2015 |
| JP | 2015-147924 A | 8/2015 |
| JP | 2015-149274 A | 8/2015 |
| JP | 2016-143488 A | 8/2016 |
| JP | 2016-525617 A | 8/2016 |
| JP | 5962873 B2 | 8/2016 |
| JP | 2017-014468 A | 1/2017 |
| JP | 2017-204410 A | 11/2017 |
| JP | 6390694 B2 | 9/2018 |
| WO | 2014/073682 A1 | 5/2014 |
| WO | 2014/112405 A1 | 7/2014 |

OTHER PUBLICATIONS

International Search Report of PCT/JP2020/016917 dated Jun. 9, 2020 [PCT/ISA/210].
Extended European Search Report dated Nov. 14, 2022, issued in corresponding European Application No. 20794040.4.

* cited by examiner

MAGNET WIRE AND COIL

CROSS REFERENCE TO RELATED APPLICATIONS

This application is a National Stage of International Application No. PCT/JP2020/016917, filed Apr. 17, 2020, claiming priority to Japanese Patent Application No. 2019-085303, filed Apr. 26, 2019.

TECHNICAL FIELD

The present disclosure relates to a magnet wire and a coil.

BACKGROUND ART

As magnet wires, enameled wires are conventionally known in which a resin such as a polyesterimide resin, a polyamide-imide resin, or a polyimide resin is baked onto a conductor.

For example, Patent Document 1 discloses a heat-resistant flat insulated electric wire obtained by applying and baking, onto a conductor, an insulating coating material produced by adding a blocked polyisocyanate which is obtained by being blocked with a polyesterimide resin and a phenolic compound to a polyetherimide resin having a specific structure and dissolving the blocked polyisocyanate in an organic solvent, and then rolling the conductor into a flat shape.

RELATED ART

Patent Documents

Patent Document 1: Japanese Patent Laid-Open No. 62-58519

SUMMARY OF THE INVENTION

Problem to be Solved by the Invention

The present disclosure aims to provide a magnet wire that has an insulating coating with a good appearance and a uniform thickness and in which the insulating coating is unlikely to develop blistering and cracks.

Means for Solving the Problem

According to the present disclosure, there is provided a magnet wire comprising a conductor and an insulating coating formed on an outer periphery of the conductor, wherein the insulating coating contains a copolymer containing a tetrafluoroethylene unit and a fluoroalkyl vinyl ether unit, the copolymer has a melt flow rate of 10 to 60 g/10 min, and the copolymer has a fluoroalkyl vinyl ether unit content of 6.2 to 8.0% by mass based on a total content of monomer units.

Preferably, the magnet wire of the present disclosure is a flat magnet wire comprising a flat conductor and an insulating coating formed on an outer periphery of the flat conductor.

Preferably, the insulating coating is a crosslinked insulating coating.

Preferably, the insulating coating is an irradiated insulating coating.

Preferably, the insulating coating is an insulating coating irradiated at a radiation dose of 20 kGy or more and less than 100 kGy, at an irradiation temperature of 160 to 280° C.

Preferably, the copolymer has functional groups, and the number of functional groups in the copolymer is 5 to 1,000 per $10^6$ carbon atoms.

Preferably, the insulating coating has a thickness of 30 to 100 μm.

According to the present disclosure, there is also provided a coil comprising the magnet wire.

Effects of Invention

The present disclosure can provide a magnet wire that has an insulating coating with a good appearance and a uniform thickness and in which the insulating coating is unlikely to develop blistering and cracks. The present disclosure can also provide a flat magnet wire that has an insulating coating with a good appearance and a uniform thickness and in which, even when the flat magnet wire is bent edgewise, the insulating coating covering the bent outer peripheral region is unlikely to develop blistering and cracks.

DESCRIPTION OF EMBODIMENTS

Specific embodiments of the present disclosure will be hereinafter described in detail, although the present disclosure is not limited to the following embodiments.

A magnet wire of the present disclosure is an electric wire used to pass electric current when an electrical device converts between electric energy and magnetic energy. For example, the magnet wire of the present disclosure may be a magnet wire (round wire) including a round conductor with a substantially round cross section and an insulating coating formed on an outer periphery of the round conductor, or may be a flat magnet wire including a flat conductor and an insulating coating formed on an outer periphery of the flat conductor. The flat magnet wire can increase the space factor of the coil more than the round wire. Hereinafter, a flat magnet wire as one embodiment of the present disclosure will be described.

Figure 1:
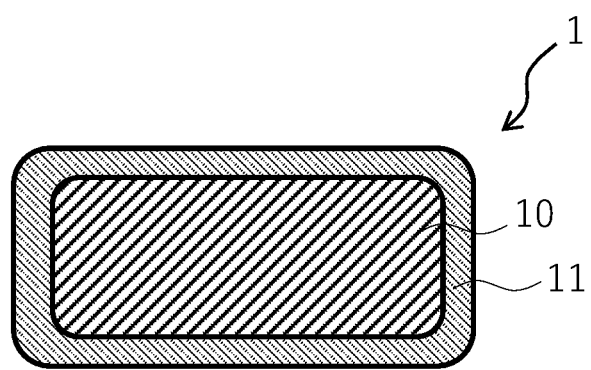
FIG. 1 is a cross-sectional view of one exemplary flat magnet wire.

FIG. 1 is a cross-sectional view of one exemplary flat magnet wire. As shown in FIG. 1, a flat magnet wire 1 according to one embodiment of the present disclosure includes a flat conductor 10 and an insulating coating 11 formed on an outer periphery of the flat conductor.

While the flat conductor 10 is not limited as long as it is formed of a conductive material, it may be formed of a material such as copper, a copper alloy, aluminum, an aluminum alloy, iron, silver, or nickel, and is preferably formed of copper or a copper alloy. Alternatively, the flat conductor 10 may be a plated conductor plated with silver, nickel, or the like.

The shape of the flat conductor is not limited as long as the cross section is in the shape of a substantially rectangular flat wire. The cross section of the flat conductor may have right-angled corners or rounded corners, for example. While the flat conductor may be a single wire, an assembled wire, a stranded wire, or the like as long as the cross section of the entire conductor is substantially rectangular, the flat conductor is preferably a single wire.

The cross section of the flat conductor may have a width of 1 to 75 mm and a thickness of 0.1 to 10 mm. The ratio of the width to the thickness may be more than 1 and 30 or less.

The insulating coating 11 formed on the outer periphery of the flat conductor 10 is formed of a copolymer containing a tetrafluoroethylene unit and a fluoroalkyl vinyl ether unit. The copolymer has a melt flow rate of 10 to 60 g/10 min. The copolymer has a fluoroalkyl vinyl ether unit content of 6.2 to 8.0% by mass based on a total content of monomer units.

In the fields of electrical and electronic devices, progress has been made in improving the performance, miniaturization, and power savings for these devices. As a result, coils, inductors, and various types of motors have been required to be smaller and improved in performance. In particular, vehicle-mounted inductors and motors have become increasingly smaller by compactly winding flat magnet wires. However, in motors used in electric vehicles, the operating voltage tends to be high from about 400 V to about 1,000 V, for the purpose of achieving smaller sizes and improved performance. Thus, when a conventional flat magnet wire such as an enameled wire is used, partial discharge may occur between windings, possibly leading to dielectric breakdown. In the flat magnet wire according to the present embodiment, because the insulating coating is formed of the above-mentioned copolymer, partial discharge is unlikely to occur even when the operating voltage of the motor is high.

It is also noted that an edgewise coil is formed by bending a flat magnet wire edgewise (in the width direction of the flat magnet wire), and vertically winding it. The edgewise coil has a high space factor of the conductor, leading to a smaller size and improved efficiency for an electrical device. However, when the flat magnet wire is bent edgewise, the insulating coating covering the bent outer peripheral region is elongated more than the insulating coating covering the bent inner peripheral region, and thus, easily peels off the flat conductor and develops blistering or cracks. Such blistering or cracks reduce the insulating properties. For example, an enameled wire in which a polyimide resin is baked onto a conductor may develop cracks or blistering in the bent outer peripheral region. In the flat magnet wire according to the present embodiment, because the insulating coating is formed of the above-mentioned copolymer, even when the flat magnet wire is bent edgewise, the insulating coating covering the bent outer peripheral region is unlikely to develop blistering and cracks.

Furthermore, in the flat magnet wire according to the present embodiment, because the insulating coating is formed of the above-mentioned copolymer, the insulating coating of the flat magnet wire according to the present embodiment is free of defects that may occur during molding or irradiation, such as melt fracture, foaming, and whitening, and has a uniform thickness. Therefore, the flat magnet wire according to the present embodiment has a good appearance.

The melt flow rate of the copolymer is 10 to 60 g/10 min, preferably 15 g/10 min or more, more preferably 25 g/10 min or more, and still more preferably 30 g/10 min or more, while it is preferably 50 g/10 min or less, and more preferably 40 g/10 min or less. When the melt flow rate of the copolymer falls in the above-mentioned range, the flat magnet wire can be provided with an insulating coating having a uniform thickness, and the flat magnet wire can also be provided with an insulating coating that has excellent stress crack resistance even with a small thickness, and is unlikely to develop blistering and cracks.

When the thickness of the insulating coating is 60 to 100 μm, the melt flow rate of the copolymer is preferably 15 g/10 min or more, more preferably 25 g/10 min or more, and still more preferably 30 g/10 min or more, while it is preferably 40 g/10 min or less. When the melt flow rate of the copolymer falls in the above-mentioned range, the flat magnet wire can be provided with an insulating coating having a uniform thickness, and the flat magnet wire can also be provided with an insulating coating that has excellent stress crack resistance, and is unlikely to develop blistering and cracks.

Moreover, when the thickness of the insulating coating is 30 μm or more and less than 60 μm, the melt flow rate of the copolymer is preferably more than 40 g/10 min, more preferably 45 g/10 min or more, and still more preferably 50 g/10 min or more, while it is preferably 60 g/10 min or less, and more preferably 55 g/10 min or less. When the melt flow rate of the copolymer falls in the above-mentioned range, the flat magnet wire can be provided with an insulating coating having a uniform thickness, and the flat magnet wire can also be provided with an insulating coating that has excellent stress crack resistance, and is unlikely to develop blistering and cracks.

As used herein, the melt flow rate is the value determined using a melt indexer (manufactured by YASUDA SEIKI SEISAKUSHO, LTD.) according to ASTM D1238, as the mass (g/10 min) of the polymer flowing out of a nozzle with an inner diameter of 2.1 mm and a length of 8 mm per 10 minutes, under 372° C. and a load of 5 kg.

The fluoroalkyl vinyl ether (FAVE) unit content in the copolymer, based on the total content of monomer units, is 6.2 to 8.0% by mass, and preferably 6.5% by mass or more, while it is preferably 7.5% by mass or less. When the FAVE unit content in the copolymer falls in the above-mentioned range, the flat magnet wire can be provided with an insulating coating having a uniform thickness, and the flat magnet wire can also be provided with an insulating coating that has excellent stress crack resistance even with a small thickness, and is unlikely to develop blistering and cracks.

The tetrafluoroethylene (TFE) unit content in the copolymer, based on the total content of monomer units, is preferably 82.0 to 93.8% by mass, more preferably 92.0% by mass or more, still more preferably 92.5% by mass or more, and particularly preferably 93.0% by mass or more, while it is more preferably 93.8% by mass or less, still more preferably 93.5% by mass or less, and particularly preferably 93.2% by mass or less. When the TFE unit content in the copolymer falls in the above-mentioned range, the flat magnet wire can be provided with an insulating coating having a uniform thickness, and the flat magnet wire can also be provided with an insulating coating that has excellent stress crack resistance even with a small thickness, and is unlikely to develop blistering and cracks.

The content of each monomer unit in the copolymer is herein measured by the $^{19}$F-NMR method.

The copolymer that forms the insulating coating is a melt-fabricable fluororesin. The term "melt-fabricable" means that the polymer can be melted and processed using a conventional processing machine, such as an extruder or an injection molding machine.

FAVE constituting the FAVE unit may be, for example, at least one selected from the group consisting of:
a monomer represented by the general formula (1):

$$CF_2=CFO(CF_2CFY^1O)_p-(CF_2CF_2CF_2O)_q-Rf \qquad (1)$$

wherein $Y^1$ represents F or $CF_3$; Rf represents a $C_{1-5}$ perfluoroalkyl group; p represents an integer from 0 to 5; and q represents an integer from 0 to 5; and a monomer represented by the general formula (2):

wherein X's are the same or different, and each represent H, F, or $CF_3$; and $R^1$ represents a $C_{1-6}$ linear or branched fluoroalkyl group that may contain one or two atoms of at least one selected from the group consisting of H, Cl, Br, and I, or a $C_{5-6}$ cyclic fluoroalkyl group that may contain one or two atoms of at least one selected from the group consisting of H, Cl, Br, and I.

Among the above, FAVE is preferably the monomer represented by the general formula (1), more preferably at least one selected from the group consisting of perfluoro (methyl vinyl ether), perfluoro(ethyl vinyl ether) (PEVE), and perfluoro(propyl vinyl ether) (PPVE), still more preferably at least one selected from the group consisting of PEVE and PPVE, and particularly preferably PPVE.

The copolymer may also contain a monomer unit derived from a monomer copolymerizable with TFE and FAVE. In this case, the content of the monomer copolymerizable with TFE and FAVE is preferably 0 to 10% by mass, and more preferably 0.1 to 1.8% by mass, based on the total content of monomer units in the copolymer.

Examples of the monomer copolymerizable with TFE and FAVE include hexafluoropropylene (HFP); a vinyl monomer represented by $CZ^1Z^2=CZ^3(CF_2)_nZ^4$, wherein $Z^1$, $Z^2$ and $Z^3$ are the same or different, and each represent H or F, $Z^4$ represents H, F or Cl, and n represents an integer from 2 to 10; and an alkyl perfluorovinyl ether derivative represented by $CF_2=CF-OCH_2-Rf^1$, wherein $Rf^1$ represents a $CF_{1-5}$ perfluoroalkyl group. Among the above, HFP is preferred.

Preferred as the copolymer is at least one selected from the group consisting of a copolymer containing only the TFE unit and the FAVE unit, and the TFE/HFP/FAVE copolymer, with the copolymer containing only the TFE unit and the FAVE unit being more preferred.

From the viewpoint of heat resistance and stress crack resistance, the melting point of the copolymer is preferably 280 to 322° C., and more preferably 290° C. or more, while it is more preferably 315° C. or less, and still more preferably 305° C. or less. The melting point can be measured using a differential scanning calorimeter [DSC].

The glass transition temperature (Tg) of the copolymer is preferably 70 to 110° C., and more preferably 80° C. or more, while it is more preferably 100° C. or less. The glass transition temperature can be measured by dynamic viscoelasticity measurement.

From the viewpoint of partial discharge resistance, the dielectric constant of the copolymer is preferably 2.10 or less, and more preferably 2.08 or less, while the lower limit is preferably 1.80 or more, although not limited thereto. The dielectric constant is the value obtained by measuring changes in resonant frequency and electric field intensity at a temperature of 20 to 25° C., using the network analyzer HP8510C (manufactured by Hewlett-Packard Company) and a cavity resonator.

The copolymer used herein has functional groups, and the number of functional groups in the copolymer is preferably 5 to 1,000 per $10^6$ carbon atoms. The number of functional groups per $10^6$ carbon atoms is more preferably 50 or more, still more preferably 100 or more, and particularly preferably 200 or more, while it is more preferably 800 or less, still more preferably 700 or less, and particularly preferably 500 or less. When the number of functional groups in the copolymer falls in the above-mentioned range, the adhesion between the conductor and the insulating coating is improved, and the effect of reducing blistering and cracks upon the insulating coating, attributed to irradiation, becomes more noticeable.

When the insulating coating is irradiated, the number of functional groups represents the number of functional groups in the copolymer contained in the insulating coating before irradiation. When the insulating coating containing the copolymer in which the number of functional groups falls in the above-mentioned range is irradiated, a flat magnet wire can be achieved in which, even when the flat magnet wire is bent edgewise, the insulating coating covering the bent outer peripheral region is more unlikely to develop blistering and cracks. The reason for this is assumed to be that the irradiation of the insulating coating accelerates the reaction in which the functional groups in the copolymer are crosslinked to each other. Moreover, when the number of functional groups in the copolymer falls in the above-mentioned range, blistering and cracks can be further reduced even if the irradiation temperature is relatively low. This can also reduce the occurrence of defects due to irradiation, such as foaming and whitening of the insulating coating, and lifting of the insulating coating from the conductor.

The functional groups include a functional group present at an end of the main chain or an end of a side chain of the copolymer, and a functional group present in the main chain or a side chain of the copolymer. The functional groups are preferably at least one selected from the group consisting of —CF=CF₂, —CF₂H, —COF, —COOH, —COOCH₃, —CONH₂, and —CH₂OH.

Infrared spectroscopy can be used to identify the type of functional groups and measure the number of functional groups.

The number of functional groups is specifically measured in the following manner. Initially, the copolymer is melted at 330 to 340° C. for 30 minutes and compression-molded to prepare a film having a thickness of 0.25 to 0.3 mm. This film is analyzed by Fourier transform infrared spectroscopy to obtain an infrared absorption spectrum of the copolymer, and a difference spectrum is obtained between the infrared absorption spectrum and a base spectrum of a completely fluorinated product containing no functional group. Based on the absorption peak of specific functional groups appearing in the difference spectrum, the number N of the functional groups per $1 \times 10^6$ carbon atoms in the copolymer is calculated according to the following equation (A):

$$N = I \times K/t \qquad (A),\text{ where:}$$

I: absorbance;

K: correction factor; and t: thickness (mm) of the film.

For reference, Table 1 shows the absorption frequencies, molar extinction coefficients, and correction factors for the functional groups in the present disclosure. The molar extinction coefficients are those determined based on the FT-IR measurement data of low-molecular-weight model compounds.

[Table 1]

TABLE 1

| Functional Group | Absorption Frequency (cm$^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2=CF_2$ |

The absorption frequencies of —CH$_2$CF$_2$H, —CH$_2$COF, —CH$_2$COOH, —CH$_2$COOCH$_3$, and —CH$_2$CONH$_2$ are lower by several tens of kaysers (cm$^{-1}$) than the absorption frequencies of —CF$_2$H, —COF, —COOH free and —COOH bonded, —COOCH$_3$, and —CONH$_2$, respectively, shown in the table.

Thus, for example, the number of the functional groups —COF is the sum of the number of the functional groups determined based on the absorption peak at an absorption frequency of 1,883 cm$^{-1}$ due to —CF$_2$COF and the number of the functional groups determined based on the absorption peak at an absorption frequency of 1,840 cm$^{-1}$ due to —CH$_2$COF.

The number of functional groups may be the total number of —CF=CF$_2$, —CF$_2$H, —COF, —COOH, —COOCH$_3$, —CONH$_2$, and —CH$_2$OH.

The functional groups are introduced into the copolymer via, for example, a chain transfer agent or a polymerization initiator used to produce the copolymer. For example, when an alcohol is used as the chain transfer agent, or a peroxide having the structure —CH$_2$OH is used as the polymerization initiator, —CH$_2$OH is introduced into an end of the main chain of the copolymer. Alternatively, by polymerizing a monomer having a functional group, the functional group is introduced into an end of a side chain of the copolymer.

The copolymer can be produced using a conventionally known method, for example, by appropriately mixing the monomers used as constituent units and additives such as a polymerization initiator, and subjecting the mixture to emulsion polymerization or suspension polymerization.

The insulating coating of the flat magnet wire according to the present embodiment is preferably a crosslinked insulating coating. When the insulating coating is crosslinked, even when the flat magnet wire is bent edgewise, the insulating coating covering the bent outer peripheral region is more unlikely to develop blistering and cracks. Moreover, when the insulating coating is crosslinked, the stress crack resistance of the insulating coating is further improved, and the obtained insulating coating is even more unlikely to develop blistering and cracks. In particular, it is not easy to form an insulating coating having a uniform thickness as well as excellent stress crack resistance. However, using the copolymer with a relatively high melt flow rate and crosslinking the insulating coating allows an insulating coating with a uniform thickness to be easily formed and simultaneously, can improve the stress crack resistance of the insulating coating. Furthermore, when the insulating coating is crosslinked, the heat resistance of the flat magnet wire is also improved.

Examples of methods of crosslinking the insulating coating include a method in which the insulating coating is irradiated. Suitable irradiation conditions will be described below.

The presence or absence of the crosslinked structure in the insulating coating can be confirmed by confirming the presence or absence of a chemical shift derived from a F atom on a tertiary carbon at a crosslink point, using $^{19}$F-NMR, according to the method described on pages 338 to 339 of the following document:

Hitoshi Imamura, "Study on the radiation crosslinking of Perfluoro-based Fluoro-Resin PFA", Seikei-Kakou, the Japan Society of Polymer Processing, 2017, Vol. 29, No. 9, p. 336-343.

The insulating coating of the flat magnet wire according to the present embodiment is preferably an irradiated insulating coating. When the insulating coating is irradiated, even when the flat magnet wire is bent edgewise, the insulating coating covering the bent outer peripheral region is more unlikely to develop blistering and cracks. Moreover, when the insulating coating is irradiated, the stress crack resistance of the insulating coating is further improved, and the obtained insulating coating is even more unlikely to develop blistering and cracks. In particular, it is not easy to form an insulating coating having a uniform thickness as well as excellent stress crack resistance. However, using the copolymer with a relatively high melt flow rate and irradiating the insulating coating allows an insulating coating with a uniform thickness to be easily formed, and simultaneously, can improve the stress crack resistance of the insulating coating. Furthermore, when the insulating coating is irradiated, the heat resistance of the flat magnet wire is also improved.

The irradiation temperature is preferably 160 to 280° C., more preferably 180° C. or more, and still more preferably 200° C. or more, while it is preferably less than 280° C., more preferably 260° C. or less, and still more preferably 250° C. or less. When the irradiation temperature falls in the above-mentioned range, a flat magnet wire can be achieved in which the insulating coating covering the bent outer peripheral region is more unlikely to develop blistering and cracks, and simultaneously, the occurrence of defects due to irradiation, such as foaming and whitening of the insulating coating, and lifting of the insulating coating from the conductor, can be further reduced.

The irradiation temperature can be adjusted using a known method, without limitation. Specific methods include a method in which the copolymer is held in a heating furnace kept at a predetermined temperature; and a method in which the copolymer is placed on a hot plate, and the hot plate is heated by passing electric current through a built-in heater of the hot plate or by means of an external heating means.

The radiation dose is preferably 20 kGy or more and less than 100 kGy, more preferably 95 kGy or less, and still more preferably 80 kGy or less, while it is more preferably 30 kGy or more, and still more preferably 40 kGy or more. When the radiation dose falls in the above-mentioned range, a flat magnet wire can be achieved in which the insulating coating covering the bent outer peripheral region is more unlikely to develop blistering and cracks, and simultaneously, the occurrence of defects due to irradiation, such as foaming and whitening of the insulating coating, and lifting of the insulating coating from the conductor, can be further reduced.

Examples of radiation include an electron beam, ultraviolet radiation, gamma-radiation, X-ray, a neutron beam, and a high energy ion. Among the above, an electron beam is preferred because of its excellent penetrability, high dose rate, and suitability for industrial production.

Examples of irradiation methods include, but are not limited to, using a conventionally known irradiation device. The irradiation may be performed once or a plurality of times, without limitation. The flat magnet wire may be irradiated in one direction and then in the opposite direction.

While the irradiation environment is not limited, the irradiation is preferably performed at an oxygen concentration of 1,000 ppm or less, more preferably in the absence of oxygen, and still more preferably in a vacuum or in an inert gas atmosphere, such as nitrogen, helium, or argon.

While the thickness of the insulating coating is not limited, it is preferably 30 to 100 μm, and more preferably 50 to 100 μm. In the flat magnet wire according to the present embodiment, the insulating coating covering the bent outer peripheral region is unlikely to develop blistering and cracks even when the insulating coating has a relatively small thickness. Moreover, because the insulating coating contains the above-mentioned copolymer, the flat magnet wire according to the present embodiment exhibits sufficient insulating properties even when the insulating coating has a relatively small thickness. Alternatively, the thickness of the insulating coating may be 60 to 100 μm, or may be 30 μm or more and less than 60 μm.

The insulating coating may optionally contain other components. Examples of the other components include additives such as a cross-linking agent, an antistatic agent, a heat-resistant stabilizer, a foaming agent, a foaming nucleating agent, an antioxidant, a surfactant, a photopolymerization initiator, an antiwear agent, a surface modifier, and a pigment. The content of the other components in the insulating coating, based on the mass of the copolymer, is preferably less than 1% by mass, more preferably 0.5% by mass or less, and still more preferably 0.1% by mass or less. While the lower limit is not limited, it may be 0% by mass or more. In other words, the insulating coating need not contain the other components.

From the viewpoint of partial discharge resistance, the copolymer content in the insulating coating according to the present embodiment, based on the total polymer content in the insulating coating, is preferably more than 99% by mass, more preferably 99.5% by mass or more, and still more preferably 99.9% by mass or more. While the upper limit is not limited, it may be 100% by mass or less. In other words, the insulating coating may contain only the above-mentioned copolymer as a polymer material. In this case, the copolymer content is 100% by mass, based on the total polymer content in the insulating coating.

In the flat magnet wire according to the present embodiment, it is preferred that the conductor and the insulating coating be in contact with each other. In the flat magnet wire according to the present embodiment, the insulating coating is unlikely to be lifted from the conductor even if a primer layer is not formed, and the flat magnet wire exhibits excellent insulating properties. The formation of a primer layer is undesirable because it increases the dielectric constant. The flat magnet wire according to the present embodiment may further include another layer formed on the outer periphery of the insulating coating.

The method of forming the insulating coating is not limited, and the conditions therefor may also be set as conventionally known. For example, the insulating coating may be formed by melt-extruding the copolymer onto the surface of the conductor. After the insulating coating is formed around the conductor, it may be irradiated.

Alternatively, the insulating coating may be formed by molding the copolymer into a tube by melt extrusion, inserting a conductor into the resulting tube, and heating and shrinking the tube. The formation of the insulating coating by heat-shrinking the tube allows the formation of wrinkles on the insulating coating to be easily reduced, and can achieve a flat magnet wire in which the insulating coating covering the bent outer peripheral region is more unlikely to develop blistering and cracks. The tube may be an elongated tube obtained by elongating the tube obtained by melt extrusion. When the insulating coating is irradiated, the tube before shrinkage may be irradiated, or the tube after shrinkage may be irradiated. Because the insulating coating according to the present embodiment has excellent stress crack resistance, it is preferably formed by the melt extrusion method. The insulating coating formed by the melt extrusion method also includes an insulating coating formed by forming a tube by the melt extrusion method, and then heat-shrinking the tube.

The flat magnet wire according to the present embodiment can be wound and used as a coil. As long as the coil according to the present embodiment is a coil formed by winding the flat magnet wire, it may be formed by winding the flat magnet wire with bent edgewise (in the width direction), or may be formed by winding the flat magnet wire with bent flatwise (in the thickness direction). Even when the flat magnet wire according to the present embodiment is bent edgewise, the insulating coating covering the bent outer peripheral region is unlikely to develop blistering and cracks. Thus, the coil according to the present embodiment is preferably an edgewise coil formed by bending and winding the flat magnet wire edgewise. While the coil according to the present embodiment is preferably a coil formed by winding the flat magnet wire having an irradiated insulating coating, it may also be a coil formed by winding the flat magnet wire having an unirradiated insulating coating. When the flat magnet wire having an insulating coating is wound, the insulating coating may be irradiated after the flat magnet wire is wound.

The flat magnet wire and the coil according to the present embodiment can be suitably used for electrical or electronic devices, such as motors, generators, or inductors. The flat magnet wire and the coil according to the present embodiment can also be suitably used for vehicle-mounted electrical or electronic devices, such as vehicle-mounted motors, vehicle-mounted generators, or vehicle-mounted inductors.

In the foregoing embodiment, the flat magnet wire has a flat conductor; however, the conductor may also be a round conductor with a substantially round cross section, for example. Similarly in the magnet wire having a round conductor as the conductor, the insulating coating preferably contains the same copolymer as the copolymer according to the foregoing embodiment. As a result, a magnet wire can be achieved that has an insulating coating having a good appearance and a uniform thickness and unlikely to develop blistering and cracks.

thickness of 0.25 to 0.3 mm. This film was analyzed by performing 40 scans using a Fourier transform infrared spectrometer [FT-IR (trade name: model 1760X manufactured by PerkinElmer Co., Ltd.)] to obtain an infrared absorption spectrum, and a difference spectrum was obtained between the obtained infrared absorption spectrum and a base spectrum of a completely fluorinated product containing no functional group. Based on the absorption peak of specific functional groups appearing in the difference spectrum, the number N of the functional groups per $10^6$ carbon atoms in the copolymer was calculated according to the following equation (A):

$$N = I \times K/t \quad \text{(A), where:}$$

I: absorbance;
K: correction factor; and
t: thickness (mm) of the film.

For reference, Table 2 shows the absorption frequencies, molar extinction coefficients, and correction factors for the functional groups in the present disclosure. The molar extinction coefficients are those determined based on the FT-IR measurement data of low-molecular-weight model compounds.

[Table 2]

TABLE 2

| Functional Group | Absorption Frequency $(cm^{-1})$ | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_3OH$ |
| —CF=CF$_2$ | 1795 | 635 | 366 | $CF_2$=$CF_2$ |

While the embodiments have been described above, it will be understood that various changes can be made to the modes or details, without departing from the spirit and scope of the claims.

EXAMPLES

The embodiments of the present disclosure will be described next with reference to examples, although the present disclosure is not limited solely to the examples.

Numerical values recited in EXAMPLES were measured by the following methods:

Melt Flow Rate (MFR)

The MFR was determined using a melt indexer (manufactured by YASUDA SEIKI SEISAKUSHO, LTD.) according to ASTM D1238, as the mass (g/10 min) of the copolymer flowing out of a nozzle with an inner diameter of 2.1 mm and a length of 8 mm per 10 minutes, under 372° C. and a load of 5 kg.

PPVE Unit Content

The perfluoro(propyl vinyl ether) (PPVE) unit content in the copolymer was measured by the $^{19}$F-NMR method.

Number of Functional Groups

The copolymer was melted at 330 to 340° C. for 30 minutes and compression-molded to prepare a film having a Evaluation of Appearance of Flat Magnet Wire Before Irradiation In the examples and comparative examples, the appearance of each flat magnet wire before irradiation obtained by melt-extruding the copolymer onto a flat copper wire was visually observed, and the appearance was evaluated according to the following criteria:

Poor: Melt fracture was observed in the insulating coating.

Good: Melt fracture was not observed in the insulating coating.

Uniformity of Insulating Coating of Flat Magnet Wire

In the examples and comparative examples, the insulating coating was peeled off the flat magnet wire before irradiation obtained by melt-extruding the copolymer onto a flat copper wire, and the thickness distribution was visually observed.

Poor: The thickness of the insulating coating was non-uniform.

Good: The thickness of the insulating coating was uniform.

Measurement of MIT Value

The copolymers used in Examples 2 to 6, 8 and 12 were each molded into a sheet with a thickness of 0.2 mm, and the obtained sheet was irradiated with an electron beam at the same irradiation temperature and radiation dose as those of each example, and the MIT value of the electron beam-irradiated sheet was measured according to ASTM D2176. Additionally, the copolymers used in Examples 1 and 7 and Comparative Examples 1 to 3 were each molded into a sheet with a thickness of 0.2 mm, and the MIT value of the sheet unirradiated with an electron beam was measured according to ASTM D2176. Specifically, a specimen (width 12.5 mm, length 130 mm, thickness 0.2 mm) was prepared from the sheet, then the obtained specimen was mounted on an MIT tester (model number 12176, YASUDA SEIKI SEI-SAKUSHO, LTD.), and the specimen was bent under the conditions of a load of 1.25 kg, a left or right folding angle of 135 degrees, and 175 folding times/minute, and the number of times until the specimen broke (MIT value) was measured.

An insulating coating formed of a copolymer that gives a sheet with a high MIT value has excellent stress crack resistance, and upon bending of the flat magnet wire, the bent outer peripheral region of the insulating coating is unlikely to develop cracks.

Evaluation of Appearance of Flat Magnet Wire After Irradiation

The flat magnet wire after irradiation produced in each example was visually observed, and the presence or absence of foaming and the adhesion were evaluated according to the following criteria:

Presence or Absence of Foaming

Poor: Foaming of the insulating coating was observed.
Good: Foaming of the insulating coating was not observed.

Adhesion

Poor: Lifting or whitening of the insulating coating was observed.
Good: Lifting and whitening of the insulating coating were not observed.

Edgewise Bending Test

Figure 2:
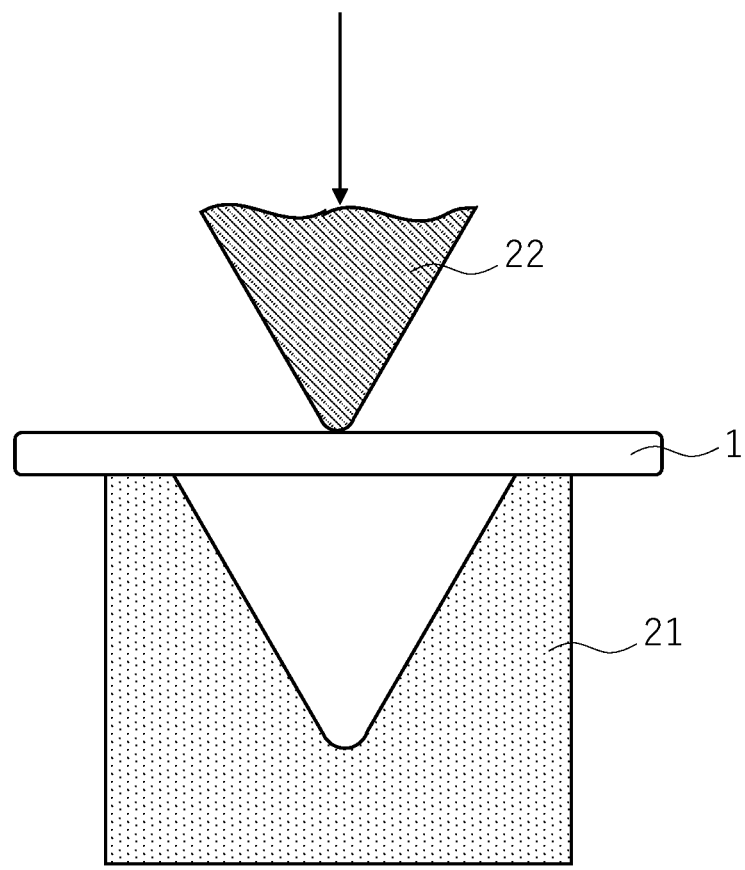
FIG. 2 is a schematic diagram of a bending jig used in an edgewise bending test.

As shown in FIG. 2, each of flat magnet wires 1 produced in the examples and comparative examples was placed on a V-block 21 so that the short side of the cross-sectional shape of the flat magnet wire 1 was brought into contact with the V-block 21. The flat magnet wire 1 was edgewise bent by pressing a press metal fitting 22 against the central region of the flat magnet wire 1 on the V-block 21 to apply a load edgewise (in the width direction), and folding the flat magnet wire 90 degrees so that the bend radius (inner diameter) was 3.50 mm (1× diameter).

The bent outer peripheral region in the bent flat magnet wire was visually observed, and evaluated according to the following criteria:

Blistering

Poor: Blistering was observed in the outer peripheral region.
Good: Blistering was not observed in the outer peripheral region.

Cracks

Poor: A number of cracks were observed in the outer peripheral region.
Fair: A few cracks were observed in the outer peripheral region.
Good: No cracks were observed in the outer peripheral region.

Comparative Example 1

A tetrafluoroethylene (TFE)/perfluoro(propyl vinyl ether) (PPVE) copolymer having the MFR, the PPVE content, and the number of functional groups shown in Table 3 was extruded using an extruder at 380° C. onto a flat copper wire (thickness: 1.95 mm, width: 3.36 mm) to obtain a flat magnet wire having an insulating coating. The thickness of the insulating coating was 80 μm. The obtained flat magnet wire was evaluated using the above-described methods. Additionally, the copolymer was molded into a sheet, and the MIT value of the obtained sheet was measured using the above-described method. The evaluation results are shown in Table 3.

Comparative Examples 2 and 3

Flat magnet wires were produced as in Comparative Example 1, except that the copolymer was replaced by copolymers having the physical properties shown in Table 3. The evaluation results are shown in Table 3.

Examples 1 and 7

Flat magnet wires were produced as in Comparative Example 1, except that the copolymer was replaced by copolymers having the physical properties shown in Table 3. The evaluation results are shown in Table 3.

Examples 2 to 6 and 8 to 14

Flat magnet wires were produced as in Comparative Example 1, except that the copolymer was replaced by copolymers having the physical properties shown in Table 3. The evaluation results are shown in Table 3.

The obtained flat magnet wires were each cut to a size of 30 cm, and put in the electron beam irradiation container of an electron beam irradiator (manufactured by NHV Corporation); thereafter, nitrogen gas was added to place the container under a nitrogen atmosphere. After the inside temperature of the container stabilized at 25° C., the flat magnet wire was irradiated with an electron beam at the radiation dose shown in Table 3, under the conditions of the irradiation temperature shown in Table 3, an electron beam acceleration voltage of 3,000 kV, and a radiation intensity of 20 kGy/5 min. The evaluation results are shown in Table 3.

In Table 3, "–" indicates that the evaluation or treatment was not conducted.

TABLE 3

| | Copolymer | | | Evaluation of Flat Magnet Wire before Irradiation | | Irradiation Conditions | | Evaluation of Flat Magnet Wire or Sheet after Irradiation | | | Edgewise Bending Test | |
|---|---|---|---|---|---|---|---|---|---|---|---|---|
| | MFR (g/10 min) | PPVE (wt %) | Number of Functional Groups (number/$10^6$ C) | Appearance | Uniformity | Temperature (°C.) | Radiation Dose (kGy) | MIT Value (times) | Foaming | Adhesion | Blistering | Cracks |
| Comparative Example 1 | 2 | 3.5 | 172 | Poor | — | — | — | 80.0*[1] | — | — | — | — |
| Comparative Example 2 | 8 | 4.5 | 230 | Poor | — | — | — | 12.0*[1] | — | — | — | — |
| Example 1 | 22 | 6.5 | 344 | Good | Good | — | — | 5.0*[1] | Good | Good | Good | Fair |
| Example 2 | 22 | 6.5 | 344 | Good | Good | 200 | 20 | 29.0 | Good | Good | Good | Good |
| Example 3 | 22 | 6.5 | 344 | Good | Good | 200 | 30 | 35.0 | Good | Good | Good | Good |
| Example 4 | 22 | 6.5 | 344 | Good | Good | 200 | 40 | 40.0 | Good | Good | Good | Good |
| Example 5 | 22 | 6.5 | 344 | Good | Good | 200 | 50 | 44.0 | Good | Good | Good | Good |
| Example 6 | 22 | 6.5 | 344 | Good | Good | 245 | 60 | 52.0 | Good | Good | Good | Good |
| Example 7 | 60 | 7.0 | 663 | Good | Good | — | — | 0.5*[1] | Good | Good | Good | Fair |
| Example 8 | 60 | 7.0 | 663 | Good | Good | 200 | 20 | 37.0 | Good | Good | Good | Good |
| Example 9 | 60 | 7.0 | 663 | Good | Good | 200 | 40 | — | Good | Good | Good | Good |
| Example 10 | 60 | 7.0 | 663 | Good | Good | 200 | 60 | — | Good | Good | Good | Good |
| Example 11 | 60 | 7.0 | 663 | Good | Good | 200 | 80 | — | Good | Good | Good | Good |
| Example 12 | 60 | 7.0 | 663 | Good | Good | 240 | 20 | 42.0 | Good | Good | Good | Good |
| Example 13 | 60 | 7.0 | 663 | Good | Good | 240 | 40 | — | Good | Good | Good | Good |
| Example 14 | 60 | 7.0 | 663 | Good | Good | 240 | 60 | — | Good | Good | Good | Good |
| Comparative Example 3 | 68 | 6.6 | 730 | Good | Poor | — | — | — | — | — | — | — |

*[1]MTI value of the sheet before irradiation

REFERENCE SIGNS LIST

1: Flat magnet wire
10: Flat conductor
11: Insulating coating
21: V-block
22: Press metal fitting

The invention claimed is:

1. A coil comprising a flat magnet wire comprising
(i) a flat conductor and an insulating coating formed on an outer periphery thereof, and
(ii) an insulating coating containing a copolymer (a) which
contains a tetrafluoroethylene unit and a fluoroalkyl vinyl ether unit,
has a melt flow rate of 10 to 40 g/10 min, and
has a fluoroalkyl vinyl ether unit content of 6.2 to 8.0% by mass based on a total content of monomer units,
wherein the insulating coating contains only the copolymer (a) as a polymer material;
wherein the coil is formed by bending and winding the flat magnet wire in an edgewise direction.

2. The magnet wire according to claim 1, wherein the insulating coating is a crosslinked insulating coating.

3. The magnet wire according to claim 1, wherein the insulating coating is an irradiated insulating coating.

4. The magnet wire according to claim 1, wherein the copolymer (a) has functional groups, and the number of functional groups in the copolymer (a) is 5 to 1,000 per 106 carbon atoms.

5. The magnet wire according to claim 1, wherein the insulating coating has a thickness of 30 to 100 μm.

* * * * *